(12) United States Patent
Zhang et al.

(10) Patent No.: US 8,077,470 B2
(45) Date of Patent: Dec. 13, 2011

(54) COVER LATCH MECHANISM, LATCH, AND PORTABLE ELECTRONIC DEVICE USING SAME

(75) Inventors: Yu Zhang, Shenzhen (CN); Shui-Jin Dong, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 402 days.

(21) Appl. No.: 12/353,334

(22) Filed: Jan. 14, 2009

(65) Prior Publication Data

US 2010/0020508 A1    Jan. 28, 2010

(30) Foreign Application Priority Data

Jul. 25, 2008    (CN) .......................... 2008 1 0303059

(51) Int. Cl.
*H05K 7/16*    (2006.01)

(52) U.S. Cl. .................... 361/747; 361/679.58; 292/194

(58) Field of Classification Search ................ 361/747, 361/679.58, 67.55; 292/194, 219, 224, 227, 292/228, 197, 80, 83, 86, DIG. 37, DIG. 11
See application file for complete search history.

(56) References Cited

U.S. PATENT DOCUMENTS

| 7,800,008 | B2 * | 9/2010 | Shi et al. ....................... 200/547 |
| 7,842,412 | B2 * | 11/2010 | Zhang et al. .................... 429/97 |
| 7,916,477 | B2 * | 3/2011 | Shen et al. ............... 361/679.58 |
| 2006/0172183 | A1 * | 8/2006 | Chen et al. ....................... 429/97 |

* cited by examiner

*Primary Examiner* — Jinhee Lee
*Assistant Examiner* — Ingrid Wright
(74) *Attorney, Agent, or Firm* — Altis Law Group, Inc.

(57) ABSTRACT

A cover latch for a portable electronic device includes a housing member forming two latching protrusions, a cover member, a mounting panel secured to the cover member, two latching members pivotally positioned on the mounting panel, and a contact member slidably positioned on the mounting panel. Each of the latching members includes a latching portion for interlocking with one of the latching protrusions. The contact member slides relative to the mounting panel to pivot the latching members to release the interlocking of the latching portions and the latching protrusions.

15 Claims, 3 Drawing Sheets

COVER LATCH MECHANISM, LATCH, AND PORTABLE ELECTRONIC DEVICE USING SAME

BACKGROUND

1. Technical Field

The invention relates to cover latch mechanisms used in portable electronic devices.

2. Description of Related Art

Portable electronic devices often include latches for securing battery covers thereof. The latch mechanisms must withstand numerous installations and removals of batteries.

A typical cover latch mechanism includes at least one spring to facilitate its operation. However, the spring wears out with repeated operation and, thus the cover latch mechanism may fail.

Therefore, there is room for improvement within the art.

BRIEF DESCRIPTION OF THE DRAWINGS

Many aspects of the exemplary cover latch mechanism, latch, and portable electronic device using the latch mechanism can be better understood with reference to the following drawings. These drawings are not necessarily drawn to scale, the emphasis instead being placed upon clearly illustrating the principles of the exemplary cover latch mechanism and the portable electronic device. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EXEMPLARY EMBODIMENTS

A latch mechanism is disclosed, for application with an electronic device. Such use can be, as described here, securing of a battery hatch cover, although the disclosure is not limited thereto. Further, the electronic device utilizing the latch mechanism, while disclosed here as a mobile phone, can conceivably be any electronic device with a securable hatch, while remaining well within the scope of the disclosure.

Figure 1:
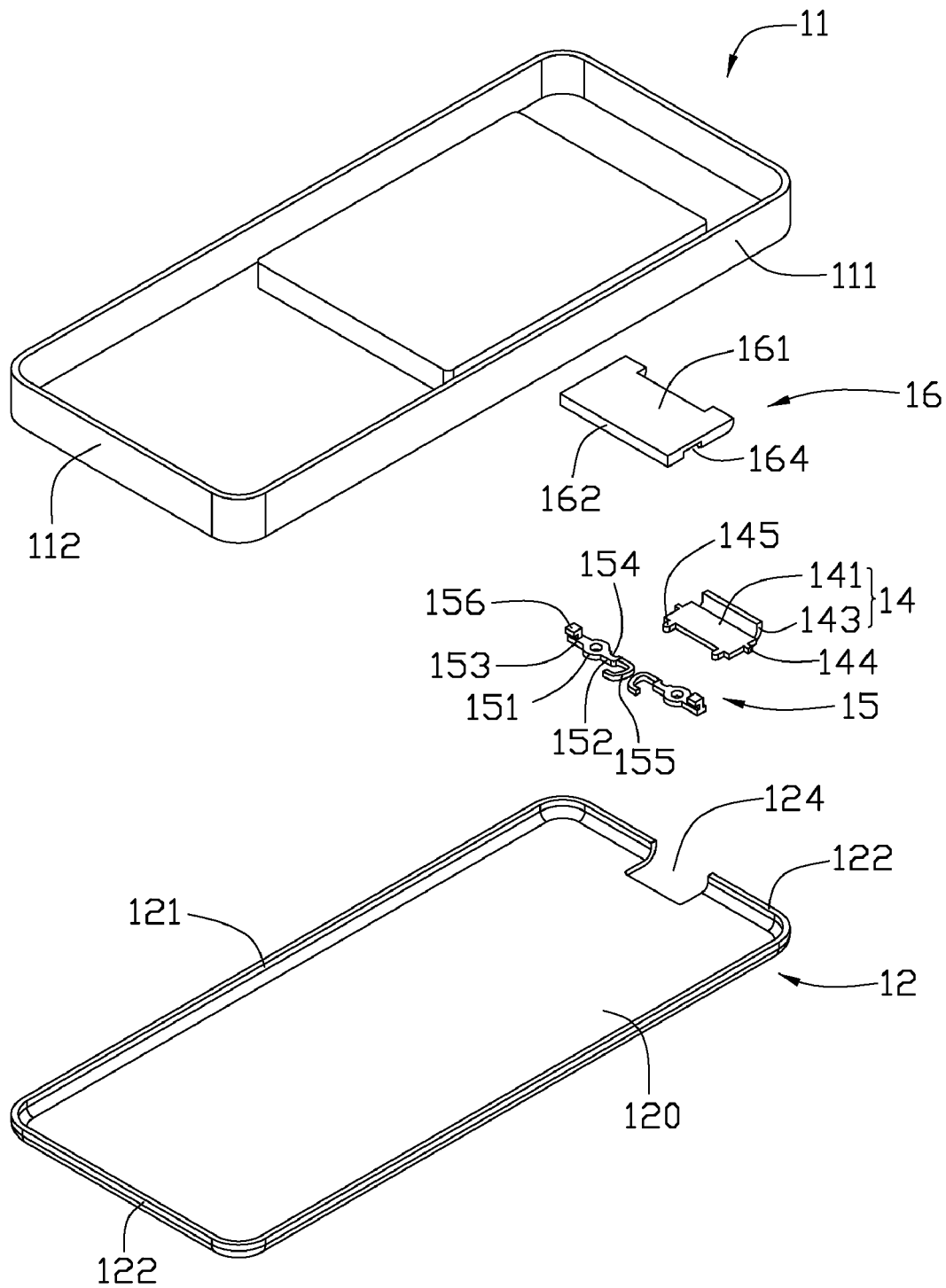
FIG. 1 is an isometric and exploded view of a cover latch mechanism used in a portable electronic device according to an exemplary embodiment.
Figure 2:
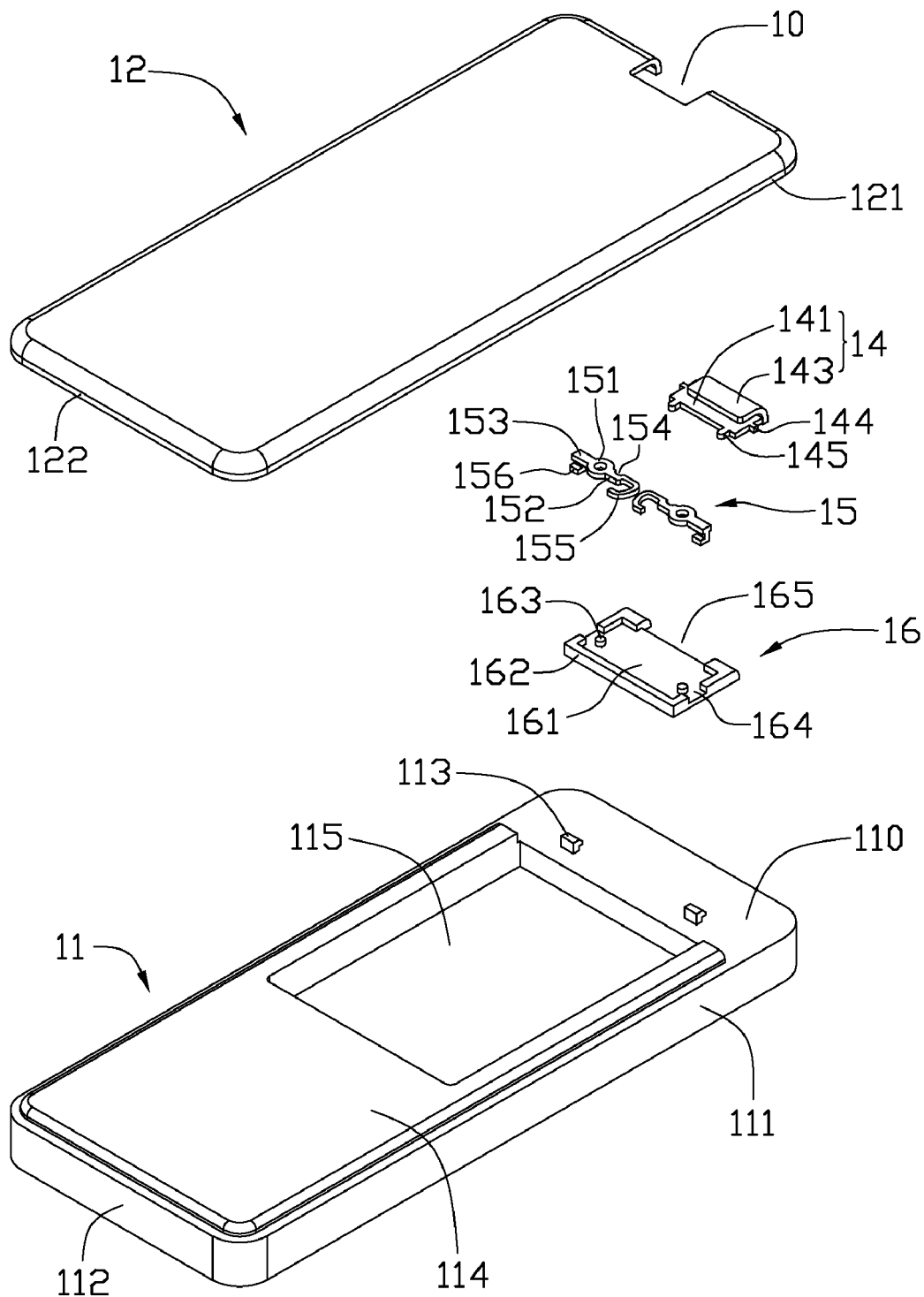
FIG. 2 is another exploded view of the cover latch mechanism shown in FIG. 1.

FIGS. 1 and 2 show a cover latch mechanism 10 used in a portable electronic device, here, mobile phone. The cover latch mechanism 10 includes a housing member 11, a cover member 12, a contact member 14, two latching members 15, and a mounting panel 16. The housing member 11 can be a housing of the portable electronic device. The cover member 12 can be a cover of the portable electronic device.

Referring to FIGS. 1 and 2, the housing member 11 includes an upper wall 110, two opposite sidewalls 111, and two opposite end walls 112. The upper wall 110 defines a battery accommodating chamber 115, and forms two generally L-shaped latching protrusions 113, and a convex block 114. The latching protrusions 113 and the convex block 114 surround the battery accommodating chamber 115.

The cover member 12 includes a bottom wall 120 and a peripheral wall 121 (shown in FIG. 2). The peripheral wall 121 is configured to interlock with the convex portion 114 when the cover member 12 latches to the housing member 11. An end portion 122 of the peripheral wall 121 defines a generally rectangular notch 124.

The contact member 14 includes a generally rectangular base panel 141 and a generally annular pressing portion 143. The base panel 141 has an end fixed to the center of the pressing portion 143, such that the pressing portion 143 partially covers the base panel 141 (best seen in FIG. 2). The base panel 141 forms two retaining protrusions 144 on two opposite sidewalls and two resisting protrusions 145 on a distal end wall of the pressing portion 143.

Each of the two latching members 15 includes a pivotable ring portion 151, a straight connecting portion 152, a straight extension portion 153, a generally C-shaped elastic portion 155, and a generally L-shaped latching portion 156. The connecting portion 152 and the extension portion 153 extend from the pivotable ring portion 151 and align with each other along the same radial length of the ring portion 151. The connecting portion 152 defines a resisting slit 154 receiving the resisting protrusion 145. The elastic portion 155 extends from the connecting portion 152 along C-shaped directions and is configured for biasing the pivoting of the latching member 15. The latching portion 156 perpendicularly secures to the extension portion 153 and interlocks with the latching protrusion 113.

The mounting panel 16 includes a bottom panel 161 and a peripheral panel 162 around the bottom panel 161. The bottom panel 161 forms two positioning columns 163 pivotally engaging through the ring portions 151. The peripheral panel 162 defines two opposite through slots 164 and an opening 165. The through slots 164 align with the positioning columns 163, enabling the extension portions 153 to pass therethrough when the ring portions 151 pivotally engage around the positioning columns 163. The through slots 164 are larger than the extension portions 153, allowing movement thereof when within. The opening 165 receives the contact member 14 within the mounting panel 16. The interior wall of the peripheral panel 162 on two sides of the opening 165 abuts the retaining protrusions 144 to prevent the contact member 14 from exiting the opening 165.

Figure 3:
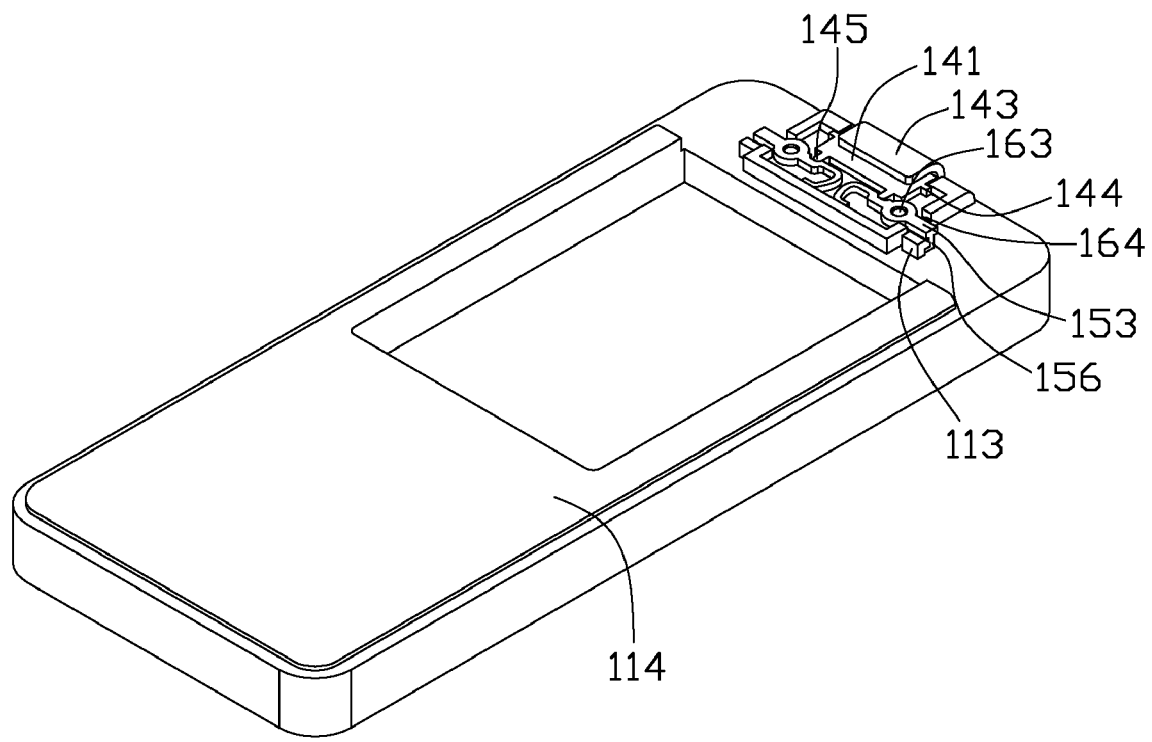
FIG. 3 is an assembled view of a cover latch including the latch mechanism of FIG. 2 with a cover member thereof omitted for clarity, the cover latch being in a latched position.

During assembly of contact member 14, the latching members 15, and the mounting panel 16 to the cover member 12, the latching members 15 can be positioned to the mounting panel 16 by placing the ring portion 151 around the positioning columns 163. Referring to FIG. 3, in this case, the extension portions 153 are arranged to pass through the through slots 164 to expose the latching portions 156. The contact member 14 can be positioned to the mounting panel 16 by two adverse and balanced abutment of the latching members 15 and the peripheral panel 162. Specifically, regarding the abutting of the latching members 15, the resisting protrusions 145 are received in the resisting slits 154 to be abutted by the connecting portions 152. The elastic portions 155 are compressed by the interior wall of the peripheral panel 162. In the abutment of the peripheral panel 162, the retaining protrusions 144 are abutted by the interior wall of the peripheral panel 162 on two sides of the opening 165. After that, the assembled mounting panel 16 can be secured (for example, by hot-melting) to the cover member 12, enabling the pressing portion 143 of the contact member 14 to be slidably received within the notch 124 of the cover member 12. In this case, the latching members 15 and the contact member 14 are positioned between the mounting panel 16 and the cover member 12.

Referring to FIG. 3, the cover latch 10 maintains its latched position. In this position, the cover member 12 latches to the housing member 11 by interlocking of the latching protrusions 113 and the latching portions 156. The latching members 15 and the contact member 14 maintain their above-described assembled position.

To assume a released position, wherein the cover member 12 is released from the housing member 11, the contact member 14 is further impelled into the opening 165 towards the latching members 15. The resisting protrusions 145 press against and pivot the connecting portions 152 around the positioning columns 163. Accordingly, the extension portions 153 and the latching protrusions 156 pivot around the positioning columns 163 away from the latching protrusions 113. During this stage, the elastic portions 155 are further compressed. When the latching protrusions 156 disengage from the latching protrusions 113, the latching of the latching protrusions 156 and the latching protrusions 113 is released and thus the cover latch mechanism 10 assumes a released position. At this time, the cover member 12 can be simply raised to detach from the housing member 11. In addition, by further releasing of the contact member 14, the compressed elastic portions 155 return to bias the latching members 15 and the contact member 14 back to their latched positions.

It is to be understood that the above releasing process can be reversed to re-latch the cover member 12 to the housing member 11.

Also disclosed, as shown in FIGS. 1-3, is a latch utilizing the disclosed latch mechanism, and an electronic device utilizing the disclosed latch mechanism in a latch.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cover latch mechanism, comprising:
    a cover member;
    a housing member forming two latching protrusions;
    a mounting panel secured to the cover member and comprising two positioning columns;
    two latching members pivotally positioned on the mounting panel, each of the latching members comprising a latching portion interlocking with one of the latching protrusions, an elastic portion elastically abutting the mounting panel to bias pivoting of the latching member towards the interlocking position, a straight extension portion having the latching portion formed near its end, and a ring portion connecting with the extension portion, the ring portions configured for pivoting around the positioning columns during the pivoting of the latching members; and
    a contact member slidably positioned on the mounting panel and sliding relative to the mounting panel to impel the two latching members to pivot to release the interlocking of the latching portions and the latching protrusions.

2. The cover latch mechanism as claimed in claim 1, wherein each latching member further comprises a connecting portion connecting with the ring portion, the contact member comprises two resisting protrusions pressing against the connecting portions around the positioning columns, enabling the extension portions and the latching protrusions to pivot around the positioning columns away from the latching protrusions.

3. The cover latch mechanism as claimed in claim 2, wherein each of the connecting portions and each of the extension portions extend from the pivotable ring portion and align with each other along the same radial length of the ring portion.

4. The cover latch mechanism as claimed in claim 2, wherein each of the connecting portions defines a resisting slit receiving the resisting protrusion.

5. The cover latch mechanism as claimed in claim 2, wherein the elastic portions are generally C-shaped extending from the connecting portions.

6. The cover latch mechanism as claimed in claim 2, wherein:
    the contact member comprises a base panel and a pressing portion fixed thereto, the base panel forming two retaining protrusions, the resisting protrusions formed on the base panel distal to the pressing portion;
    the mounting panel further comprises a peripheral wall and defines an opening, the contact member passing through the opening within the mounting panel and secured therein by abutment with the peripheral wall.

7. The cover latch mechanism as claimed in claim 6, wherein the base panel forms two resisting protrusions abutting the peripheral wall to prevent the contact member from exiting the opening.

8. The cover latch mechanism as claimed in claim 1, wherein the mounting panel further comprises two through slots aligned with the positioning columns, the extension portions passing through the through slots to expose the latching portions.

9. A cover latch, comprising:
    a cover member;
    a housing member forming two latching protrusions;
    a mounting panel secured to the cover member and comprising two positioning columns;
    two latching members pivotally positioned on the mounting panel, each of the latching members comprising a latching portion interlocking with one of the latching protrusions, an elastic portion elastically abutting the mounting panel to bias pivoting of the latching member towards the interlocking position, a straight extension portion having the latching portion formed near its end, and a ring portion connecting with the extension portion, the ring portions configured for pivoting around the positioning columns during the pivoting of the latching members; and
    a contact member slidably positioned on the mounting panel and sliding relative to the mounting panel to pivot the two latching members to release the interlocking of the latching portions and the latching protrusions.

10. The cover latch as claimed in claim 9, wherein each latching member further comprises a connecting portion connecting with the ring portion, the contact member comprising two resisting protrusions impelling the connecting portions around the positioning columns, pivoting the extension portions and the latching protrusions around the positioning columns away from the latching protrusions.

11. The cover latch as claimed in claim 10, wherein each of the connecting portions and each of the extension portions extends from the pivotable ring portion and aligns with each other along the same radial length of the ring portion.

12. The cover latch as claimed in claim 10, wherein each of the connecting portions defines a resisting slit receiving the resisting protrusion.

13. The cover latch as claimed in claim 10, wherein the elastic portions are generally C-shaped extending from the connecting portions.

14. The cover latch as claimed in claim 10, wherein:
the contact member comprises a base panel and a pressing portion fixed to the base panel, the base panel forming two retaining protrusions, the resisting protrusions formed on the base panel distal to the pressing portion;
the mounting panel further comprises a peripheral wall and defines an opening, the contact member configured for passing through the opening within the mounting panel and secured therein by abutment with the peripheral wall.

15. The cover latch as claimed in claim 14, wherein the base panel forms two resisting protrusions abutting the peripheral wall to prevent the contact member from exiting the opening.

* * * * *